United States Patent [19]
Amano et al.

[11] 3,888,580
[45] June 10, 1975

[54] PROCESS OF AND SYSTEM FOR PRINTING IN COLOR PHOTOGRAPHY

[75] Inventors: Tadashi Amano; Ryuichi Andoh, both of Tokyo, Japan

[73] Assignee: Konishiroku Photo Industry Co., Ltd., Tokyo, Japan

[22] Filed: May 23, 1973

[21] Appl. No.: 363,266

[30] Foreign Application Priority Data
May 25, 1972   Japan............................ 47-051176

[52] U.S. Cl.................................. 355/38; 355/77
[51] Int. Cl. ............................................ G03b 27/76
[58] Field of Search........................ 355/35, 38, 77

[56] References Cited
UNITED STATES PATENTS

| | | | |
|---|---|---|---|
| 3,519,347 | 7/1970 | Bowker et al. | 355/38 X |
| 3,708,676 | 1/1973 | Huboi et al. | 355/38 X |
| 3,724,947 | 4/1973 | Paulus | 355/38 |

*Primary Examiner*—Richard A. Wintercorn
*Attorney, Agent, or Firm*—Bierman & Bierman

[57] ABSTRACT

A new automatic printing process is provided. According to the process, variables necessary for setting printing conditions in color photography, that is, frame sizes, Kinds, qualities and color densities of the negative films are put into codes and these codes are sorted. One combination of said sorted codes which is derived based on data obtained through measurment of the negative film to be printed is used for exposure correction is printing.

There may be used whole area transmittance density, minimum and maximum transmittance density, central are transmittance density and upper and under area transmittance density as color densityes.

5 Claims, 2 Drawing Figures

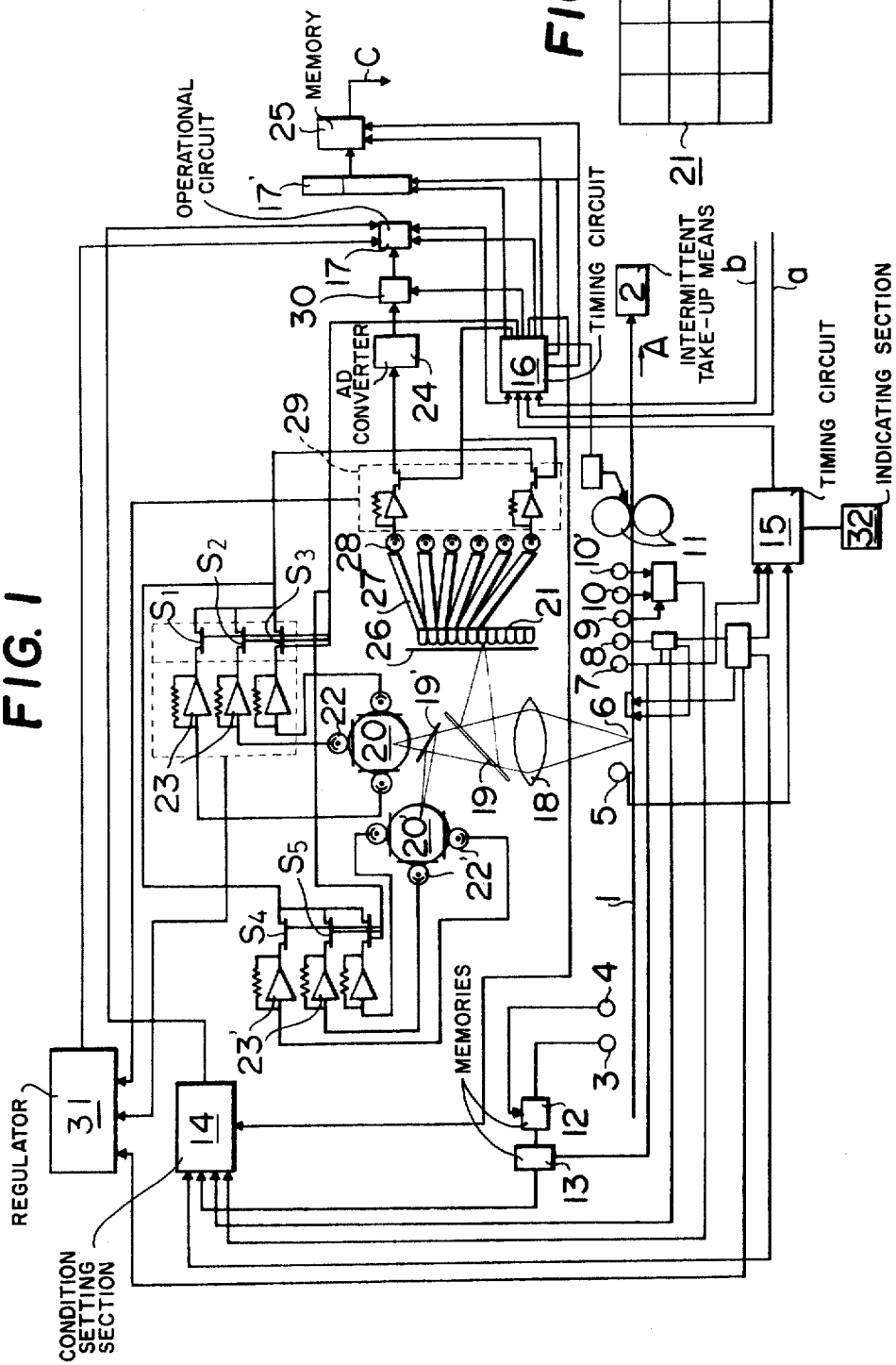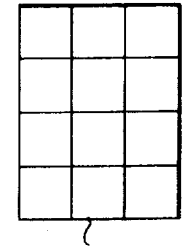

PROCESS OF AND SYSTEM FOR PRINTING IN COLOR PHOTOGRAPHY

BACKGROUND OF THE INVENTION

Generally, the color negative film frame has dark and light distribution and color tone distribution. The blue, green and red densities are different in different parts of the frame.

In addition to the above individual negative films are not always obtained through proper exposure. Therefore, the exposure at the time of printing must be appropriately adjusted.

In most cases, however, prints are obtained by the exposure throguh adjustment in which the exposure is controlled so as to make the blue, green and red color intensities of transmitted light through the whole frame a predetermined level.

This is based on the empirical principle that the average reflectivity of the three colors integrated from the whole scence is roughly constant in ordinal photographed scenes. The average density of color negative films obtained by photographing usual neutral scenes varies depending upon the extent of exposure, quality of the light source used for photographing, sensitivy of blue, green and red color sensitive layers of the color negative film, presence of mask and other factors.

These variations are automatically compensated for by providing uniform exposure for blue, green and red colors at the time of printing.

On the other hand, variations of three color densities of the subject, giving rise to variation of area proportions of three colors of the subject, cannot be compensated for with the afore-mentioned prior-art method of control. In another aspect, where the brightness distribution extraordinarily differs from the usual brightness distribution for instance where high brightness area or low brightness area occupys an extraordinarilly great proportion compared with the usual scene, the variation of the negative film density cannot be compensated for with the prior method of controlling exposure at the time of printing only according to the average density, since the density variation of the negative film comes from the areal brightness variation of the subject also, where the main subject constitutes a shadowy area or very pronounced highlight area compared to the surrounding back ground, the scene composition greatly departs from conditions set in the printer, so that it is impossible to make correction.

SUMMARY OF THE INVENTION

It is therefore an object of this invention to provide a process and a system for printing in color photography, which enable correction that has heretofore been impossible and automatically prepare high quality color prints by detecting correction data for printing and specifying as an information right correction amount at the time of printing according to the detected data.

It is another object of this invention is to provide a process and a system for printing in color photography, in which the density failure is detected by measuring the whole area transmittance.

Additional fourther object of the invention is to provide a process of and a system for automatic printing in color photography by automatically detecting the frame size, kind and quality of the negative film and using the detected information to specify the negative film as such so as to specify the corresponding extent of correction for automatic printing.

In accordance with this invention, a new printing process is provided. The process comprises a step of putting many kinds of variables such as frame sizes, kindes qualities and color densities of negative films into codes, a step of combining and sorting said codes, a step of measuring negative films to be printed with respect to said variables, a step of selecting and memorzing one combination of said codes in accordance with the result of said measurement and a step of printing with the correction based on said memonged codes.

DETAILED DESCRIPTION OF THE INVENTION

The invention will now be described by having reference to the drawings.

FIG. 1. Shows a view outlining the process accoding to this invention.

FIG. 2. Shows a measuring member for density measarment.

Reference numeral 1 designates a long negative film consisting of many negative films spliced one after another and having notches each cut at appropriate position for each frame. The film 1 is fed in the direction of arrow A and is taken up by an intermittent take-up means 2.

In this course, it proceeds past a station 3 for detecting the property of film base, station 4, for detecting spliced portion, notch detecting station 5, negative film determining station 6, for detecting the property of negative film, splice detecting station 7, frame size detecting station 8, reader detecting station 9, kinds identifining station 10 and negative carrier braking station 11. The order of arrangement fo these stations may be desirably changed. In the detecting station 3, the mask density of each negative film is measured.

When each spliced portion of a negative film 1 reached the splice detecting station 4 located close to the detecting station 3, a reset pulse is produced from the splice detecting station to clear a memory 12, whereby the signal from the base detecting station 3 is memorized in the memory 12.

The signal thus memorized is transferred, by a signal from a splice detecting station 7 located after the negative detecting station 6, to another memory 13, and then it is transferred to a condition setting section 14.

The notch detecting station 5 serves to detect notches provided on individual frames so that the negative film is introduced frame by frame into the negative film detecting station 6. It is adapted to co-operate with timing circuits 15 and 16 in the measurement the negative film.

In the negative detecting section 6, the negative density distribution and intensities of three color components of transmitted light are measured as will be described hereinafter in detail. The frame size detecting station 8 detects the frame size, for instance full size, half size and so forth. The leader detecting station 9 and film kind identifying station 10 are provided so as to treat the negative films in accordance with the kind of said films.

The leader detecting station provides reset signals by which the film kind identifying station is reset and negative films made by different manufactureres with photographic characteristics in each manufacturer are identified by the film kind indentifying stations.

The identification signal from the station 10 is transferred to the condition setting section 14.

The negative carrier braking station 11 is controlled by the timing circmit 16 to effect the intermittent feed of the negative film. The timing circuit 16 is timed to the notch detection signal.

In the above way, various signals concerning the base measurement, picture size, kind of films classified in accordance with different manufacturers and so forth are fed to the condition setting section 14. In the condition setting section 14 there is stored predetermined conditions in the digitalised form, and digital codes corresponding to individual input signals are selected and coupled to the following operational circuit. The negative measuring station 6 has a role of detecting the neutral image density three color components transmittance density of the negative film indroduced into it.

For the detection, light transmitted through the negative film which is originally illuminated from a light source (not shown) passes through a lens 18 and a half mirror 19 and then a part of the light transmitted is introduced to an integrating sphere 20 for the determination of the three color component densities and another part thereof is also led to a detecting member 21 for the determination of the density.

As this time, a given negative film is held at a predetermined position in response to the detection of a corresponding notch at the notch detecting station, and it is designed that the notch detection signal is fed to the operational circuit through the 17, timing circuits 15 and 16 to cooperate together with the detected value.

The three color component densities determination integrating sphere 20 is provided with three photoelectron multipliers 22, which are individually provided with respective red (R) green (G) and blue (B) filters for detecting intensities of red, green and blue components of the transmitted light respectively.

The outputs of the photoelectron multipliers 22 which are proportional to the density of light intensities are fed through respective amplifiers 23 to an analog-to-digital converter (named AD converter) 24, which converts its input, into digital form, and whose output is added to the operational circuit 17 for digital operation.

When signals representing the blue, green and red densities are obtained in the above way, corresponding correction values are selcted from a library of preset digital correction codes and coupled to the operational circuit for operation with the operands from the condition setting section 14. The results of operation are read out by a reader and written in a memory 25. In this way, information concerning individual frames is successively memorized.

Another half mirror 19 is provided in the path of transmitted light going to the three color component densities determination integrating sphere 20, and it is so arranged that light reflected by it falls upon another integrating sphere 20' for the determination of densities of three color components of light transmitted through only a central portion of the picture. By so arranging, color correction to be described hereinafter can be conventiently carried out.

Meanwhile, light reflected by the half mirror 19 is led to the measuring member 21 for the determination of the density. A filter 26 and light leading tubes 27, (for instance, optical fiber) co-operate with the density measuring member 21 to lead light to photolectron multipliers 28. The neasuring member 21 consists of a plurality of distinct sections or dividions as shown in FIG. 2.

These divisions may be in any arrangement provided such that the density can be independently measured for central area, upper side area, lower side area left, side area and right side area of the picture.

They are individually coupled through the independent light conducting tubes 27 to the respective photoelectron multipliers 28. The detection here may be done for the three colors, although it may done for only one color as will be described hereinafter.

The outputs of the individual photomultipliers 28 are coupled through amplifier member 29 to the AD converter 24, whose output is in turn fed to the operational circuit 17 for operation, and correction codes corresponding to the results of operation are selected from pre-provided codes and memorized in the memory 25.

A library or list of said selected codes is stored in a correction data memory (read only memory) 17' and pertinent correction values are selected by corresponding signals.

In the illustrated embodiment only a single AD converter 24 is employed, so that change-over switches $S_1$, $S_2$... $S_n$ are provided to successively switch the outputs of the amplifiers 23 and 29 which are fed to the AD converter. At this time, the scanning of the sitches is done under the control of the timing circuit 16, and the results of measurements are fed to a sift register 30, so that they can be collectively added to the operational circuit 16, and the results of measurements are fed to a shift register 30, so that they can be collectively added to the operational circuit 17.

Alternatively, the shift register 30 may be dispensed with by providing AD converter like one 24 to each of the amplifiers 23 and 29.

In this case, the outputs of the converters are directly fed to the operational circuit 17.

As mentioned earlier, the density measuring member 21 consists of a plurality of divisions in order to masure maximum transmittance density, minimum transmittance density and central area transmittance densities upper side area, underside area, left side area and right side area transmittance densites as well as whole area tansmittance density. The results of these measurements are used in combination to calculate correction values for correcting various density failures.

Numeral 31 designates a regulator to regulate the sensitivity of the detectors such as ones 23, 23' and $a8$, and numeral 32 designates an indicating section consisting of an indicator tube for the display of such information as number of measurements and extent of correction.

The method of various corrections involved in the printing and the printing method will be described hereinafter.

Generally, the deviation of the brightness distribution between whole area transmittance density and intermediate fransmittance density (arithmetic mean of maximum and minimum densities).

The whole average transmittance density varies with various factors, for instance with the scene composition or insufficient or excessive exposure. Variations due to the scene composition are termed density failures. In this case, automatic control system for giving constant exposure must be imoperative and manual control is effected.

In this case, the relation between central density and peripheral density has great significance. The relation between central density and peripheral density is determined on the basis of that it is highly probable that the main subject occupys the central position of the scene. The central density is determined by using the maximum density of a central area of the picture if the whole average density of that area is mask's transmittance density plus 0.5, while the minimum transmittance density of the central area is used if that whole area transmittance density is above the aforementioned level. This is done so in that exposure compensation must be given if the density of the main subject is extrenely higher or lower than a ordinal level, and since the brightness of the main subject is usually high, the density of the main subject can be determined by using the maximum transmittance density of a central portion. In case of a scene where a man stands in a snowy background, the subject is found in a very shadowy portion. In this case, the whole area transmittance density is high but the density of the main subject (the man) is low. Therefore, the determination of the density of the main subject in this case may be done by comparing the minimum density of a central area or central area transmittance density with the peripberal transmittance density. The peripheral area transmittance density is sufficiently measured by the measurement of upper, under, left side and right side area transmittance densities.

If the upper transmittance density is higher than the under side transmittance density, the main subject is present in the under region or so-called low brightness area. Conversely, if the under side transmittance density is higher than the upper side transmittance density, the main subject is present in the high brightness area. Thus, an excellent print can be obtained by correcting the exposure in the increasing direction of the main subject is present in the high brightness area. At this time, information about the density of the main subject is not used in the case that it is found necessary to provide correction with respect to a difference between upper and under side area transmittance densities.

When there is found a difference between left side and right side areas that requires correction, the central area transmittance density is predicted in the same consideration above. In this case, the value detected as the central area transmittance density itself is not used. In case if the whole area transmittance density and central area transmittance density are both low and nevertheless the maximum transmittance density is high (except for the upper density), the main subject is to be in the maximum density area. (In this case, however, it is assumed that the maximum density is not present in the upper edge portion of the picture and that central density is not extremely low.)

The combination of the whole area transmittance density and intermediate density determined in the aforementioned way and main subject density determined from the afore-mentioned relation is used to specify a corresponding correction value to be read out from the read only memory 17', which contains an assortment of various correction values preset for respective types of negatives and written in the digital form. It will thus be appreciated that according to the invention no operational time is required to derive the correction value since it is merely read out in the above way. Also, there is no need of carrying out operations involving non-linear variables of films, so that it is possible to obtain improved processing speed and efficiency. For the compensation for various changes of the detectors in course of time a correction circuit is provided. The correction circuit is provided with a memory to read and memorize the photocurrent in each detector. The memorized values are used to derive their ratio to the photocurrent for various parts of the negative films being measured, whereby the adjustment of the detector can be readily effected. (The method of the determination of the compensation value is partly disclosed in Japanese Patent Application No. 78.344/1971.)

The color correction is made by measuring blue, green and red densities over the whole picture area and classifying by means of blue, green and red axes and then color correction is determined by means of the combination of the neasured densities and blue, green and red densities of the central area. The variation of blue, green and red densities on the color film are affected by the color balance of a scene and light source for photography. The variations of the density due to different light sorces for photography are not corrected at the time of printing. Rather, they must be controlled so as to be contrary with respect to the correction for density variations due to variations of color based on the non-linearity of properties of individual color-sensitive layers of different films.

In order to distinguish one of these two variations from one another, the whole area transmittance densities (blue, green and red densities) and central area transmittance densities are compared. When the result of the whole area transmittance densities indicates the probabillity of correction value determined from the whole area transmitance densities is given only if correction in the opposite direction or no correction is found necessary with respect to the central area transmittance densities.

In this method, an additional judgement that the light quality in daylight photographing has changed is incorporated when there holds a relation $$(D_B - D_{BS}) - (D_G - D_{GS}) \cong (D_G - D_{GS}) - (D_R - D_{RS})$$

(1)

Where $D_{BS}$, $D_{GS}$ and $D_{RS}$ respectively represent blue, green and red whole area transmitttance densities of a standard negative film used for the setting of the control of an aoutomatic printer in the printing of a color photograph, and $D_B$, $D_G$ and $D_R$ respectively represent blue, green and red whole area transmittance densites of the negative film to be printed. However, blue sky is the high color temperature sunlight source. Therefore, when blue sky characteristics are identified, it is decided that blue sky is photographed and that a color failure is present in the foreground subject even if equation 1 holds.

The afore-mentioned density relation requiring correction with respect to the whole area transmittance average densities is deduced from the densities $D_B$, $D_G$ and $D_R$ equation 1 and densities of central area (foreground subject). For the color correction the correction value can be readily calculated from the detected values of the three color densities as disclosed in the Japanese Patent Publication No. 37,382/1969. Accordingly, the code assortment for this correction may be omitted by so arranging as to derive the correction Valvue through digital operation in order to reduce the cost of the apparatus.

In this case, the detecting means may be reduced in size, so that they may be advantageously assembled into the exposure means for printing to provide for analog treatment. Of course, this falls in the scope of the present invention.

In view of the exposure condition, the fluorescent lamp has a unique quality, and in this case the condition of equation 1 is not satisfied.

Examination of typical examples photographed with fluorescent lamp reveals that the green density over the negative film is very high compared with the other color densities due to the green light of the fluorescent lamp. The overall density relation here resembles that of a pricture of a green scene, but these two relations are different insofar as the foreground subject is concerned. This fact is used for detecting the fluorescent lamp. Where fluorescent and tungsten lamp (with which equation 1 is satisfied) is used as photographing light, the correction that is required at the time of color printing due to the non-linear characteristics of the properties of the film is very great.

Where fluorescent and tungsten lamp (with which equation 1 is satisfied) is used as photographing light, the correction that is required at the time of color printing due to the non-linear characteristics of the properties of the film is very great.

Accordingly, it is so arranged that relavant correction is given only when a fluorescent or tungsten lamp is used as a photographing light source. When with respect to the vohole area trnsmittance densities, the differencies $\Delta B \Delta G$ and $\Delta R$ between blue, green and red densities of a standard negative film and these of a negative film to be printed are in the relation of $\Delta B << \Delta G$ and $\Delta G << \Delta R$, it is decided that a tungsten lamp is used or a scene is red and further, when the similar relation is held for the central area densities, it is decided that a tengsten lamp is used. Under these conditions, it is decided that the correction with respect to light quality is required.

Also, when with respect to the whole area trnsmittance densities, the relation of $\Delta B >> \Delta G$ and $\Delta G >> \Delta R$ is held and also with respect to the central densities similar relation is held, it is decided that a fluorescent lamp is required.

The various corrections described above are done by determing their amount from measured values which are combined with operands selected from prearranged negative film data written in the condition setting section 14.

Also, color correction data are provided for various values of whole area transmittance blue, green and red densities and stored in the form a list in the read only memory 17', so that the amount of correction can be speedily determined from the sorting of the negative being measured.

The printing process will now be described. There are two color printing systems, namely on-line and ofline systems. (The automatic printer is not illustrated.)

The correction value is selectively taken out from the list of correction data, which amy be stored in core memory in the case of the on-line system and in a cassette memory (or in a punched tape) in the case of the off-line system.

In the on-line system, the printer and negative film determining unit operates independently form each other so that a film accummulator is desirably provided between the two.

The negative film, on which the printing is to be made, is held at a predetermined position in the negative film determining unit for picture frame (or it is subjected to the frame detection in the preceding stage with a frame position mark provided on the film by forming a notch at a predetermined position), and corresponding codes are read out from the read only memory 17' and sent to the memory 25.

At this time, if the frame detection is not done in the preceding stage, the notch is formed as such a position that the printing is not affected. It is assumed here that the negative carrier consists of several tens to several handreds films spliced one after another, and the splice detection signals are also memorized in the memory 25.

In the on-line system the negative film is transferred from the negative film determining unit to the printer where the splice detection and the frame position mark detection are done.

In the on-line system the negative film is transferred from the negative film determining unit to the printer where the splice detection and the frame position mark detection are done. The detection signals are used as read command $a$ to the memory 25, while they are also as stop command $b$ to the expoaure section.

In the memory 25 information is written successively from the first address and successively read out as readout signal from the first address and successively read out signal $c$ according to the read command.

It is convenient if the frame position mark is immediately before the film is stopped at the predetermined position.

The number of frames determined between adjacent splices is the same as the number of stop commands obtained in the same as the number of stop commands obtained in the printer. A warning signal is adapted to be produced if the number of reads from the memory 25 does not coincide with the number of writes therein.

In this way, synchronization is achieved with the splices written in the memory 25, memorized information and frame detection number, whereby normal operation free from malfunctioning can always be ensured. Similar operation can be obtained in the case of the off-line system by using a cassette memory or the like.

In the above correction the detection of the density failure is desirably done from three color densities, but it may be done with respect to only a single color such as blue or green color.

In this case, if the measured color density determined as color extraordinarily differs from the other densities, average quantities given for the main subject densities. (without giving information for particularyly high or low densities). This relation is varied according to the whole area transmittance densities.

In a preferred printing system, the color correction is done mainly in the form of lowward correction, and the lowward correction is done away with for negatives having density failures due to unique exposure condition. In other words, it is preferable to arrange such that while the extent of color correction is determined according to the whole area densities, where extraordinarily colorless highlight is present in the scene, affecting the average three color densities, the constants for calculating the extent of color correction are varied according to the density failure.

Further, in the printing for a negative having been subjected to very excesive or insufficient exposure a printer is then adapted to received the print omission signal provided simultaneously with the stop command from the first frame provided the film has a non-exposed portion at least having a predetermined length, for instance 30mm.

If the length of, the non-exposed portion is less than the predetermined length (30mm), however no stop signal is memorized or print omission signals are memorized in the information processing section for the first couple of frames.

This is done so because when photographic shot is carried out by a camera attached a lens cap in front of the objective, the negative film has unexposed fromes, effective pictures exist from on first frome, but when the negative film has no exposed frome the probability that the fist couple of frames are of no value is 90 percent or higher.

In addition, negatives having strong blare or de-focus may readily kept from printing by detecting them in a preceding stage and feeding corresponding print omission signals to the information processing section. As has been described in the foregoing, with the process of and system for printing in color photography according to the invention the printing is made by determining means and coupling the derived information to the printer at the time of printing.

Also, high quality prints can be obtained since it is possible to rapidly calculate the correction values. Further, in the case of the on-line system both negative film determining unit and printer can operate without departing from a predetermined operational relation to each other.

What is claimed is:

1. A process for printing in color photography comprising: measuring a plurality of kinds of densities of a photographic film to be printed;
   selecting, in accordance with the results of said measurement, one of a plurality of sets of sorted codes derived from previously encoded densities regarding photographic films expected to be printed, each of which codes in the set belongs to one kind of said plurality of kinds of densities;
   storing said selected set;
   printing said film in accordance with signals from codes of said stored set, said signals comprising correction signals for correcting exposure time, said correction signals being in accordance with a whole area transmittance density, a maximum transmittance density, a minimum transmittance density and a peripheral area transmittance density.

2. The process for printing in color photography according to claim 1, wherein a peripheral area in a frame of the film to be printed for measuring said peripheral area density is divided into a right side area, a left side area, an upperside area and an under side area in order to respectively measure a right side area transmittance density, a left side area transmittance density, an upper side area transmittance density and an underside area transmittance density, said densities being used to determine the peripheral area transmittance density.

3. The process for printing in color photography according to claim 1, wherein said correction is carried out in accordance with codes derived from blue, green and red whole area transmittance densities, blue, green and red maximum transmittance densities, blue, green and red minimum transmittance densities and blue, green and red peripheral area transmittance densities.

4. A system for printing in color photography comprising:
   measuring means for measuring a whole area transmittance density, a maximum transmittance density, a miminum transmittance density, a central area transmittance density, an upper area transmittance density and an under side transmittance density of a photographic film to be printed with respect to at least one color;
   converting means for digitalizing said measured densities;
   sorting means for sorting the film according to combinations of density levels of said digitalized measured densities;
   reading and sending means for receiving signals from said sorting means and sending out corresponding correction data previously stored in digital form therein;
   storage means for storing from said reading and sending means;
   and printing means for printing said film in accordance with said stored data.

5. A system for printing in color photography according to claim 4, wherein said measuring means measure blue green and red color transmittance densities of the film.

* * * * *